(12) United States Patent
Dakin et al.

(10) Patent No.: US 8,659,748 B2
(45) Date of Patent: Feb. 25, 2014

(54) SCANNING NON-SCANNING LIDAR

(75) Inventors: Elizabeth A. Dakin, Great Falls, VA (US); Priyavadan Mamidipudi, Bristow, VA (US); Philip L. Rogers, Hume, VA (US); Rupak Changkakoti, Haymarket, VA (US); Daniel C. Dakin, Great Falls, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 178 days.

(21) Appl. No.: 13/396,313

(22) Filed: Feb. 14, 2012

(65) Prior Publication Data

US 2013/0044309 A1    Feb. 21, 2013

Related U.S. Application Data

(60) Provisional application No. 61/443,021, filed on Feb. 15, 2011.

(51) Int. Cl.
*G01C 3/08* (2006.01)
*G01B 9/02* (2006.01)

(52) U.S. Cl.
USPC .......................................... 356/4.09; 356/482

(58) Field of Classification Search
USPC .................. 356/4.09, 28.5, 482, 486, 498
See application file for complete search history.

(56) References Cited

U.S. PATENT DOCUMENTS

| 5,157,257 | A | 10/1992 | Geiger |
| 5,832,006 | A | 11/1998 | Rice et al. |
| 6,577,417 | B1 | 6/2003 | Khoury |
| 7,898,435 | B2 | 3/2011 | Rogers et al. |
| 2002/0105632 | A1 | 8/2002 | Holton |
| 2005/0213075 | A1* | 9/2005 | Cooke ............................ 356/28 |
| 2011/0037970 | A1* | 2/2011 | Rogers et al. .................. 356/28 |

OTHER PUBLICATIONS

International Search Report directed to related International Patent Application No. PCT/US2012/025249, mailed Sep. 27, 2012, from the Korean Intellectual Property Office; 3 pages.

* cited by examiner

*Primary Examiner* — Gregory J Toatley
*Assistant Examiner* — Hina F Ayub
(74) *Attorney, Agent, or Firm* — LeClairRyan, a Professional Corporation (57) ABSTRACT

An all fiber optic laser based scanning system for real time terrain mapping under degraded visual conditions is disclosed. A laser output is modulated to achieve a desired pulse width and pulse repetition frequency (PRF) and the modulated signal is amplified. The amplified optical signals are split into N channels that correspond to N elements of an optically phased array that steers light by modulating the phase of light entering and exiting the optical system. By applying a linear phase shift across the beam's wave front, the light propagating along the system's optical axis is steered to an off-axis angle. A real time map of an underlying terrain is accomplished by sweeping the N channel array across the terrain while collecting range information from each scan grid.

20 Claims, 9 Drawing Sheets

SCANNING NON-SCANNING LIDAR

CROSS REFERENCE TO RELATED APPLICATIONS

This application claims benefit under 35 U.S.C. §119(e) to U.S. Provisional Patent Application No. 61/443,021, filed Feb. 15, 2011, which is incorporated by reference herein in its entirety.

BACKGROUND

1. Field of the Invention

This disclosure relates to a system and method that provides an airborne vehicle operator environmental condition information to assist in operating the airborne vehicle in less than optimal visibility situations.

2. Background Art

Low or no visibility situations, sometimes called degraded usable cue environments (DUCE), can severely limit a pilot's<situational awareness (SA) during take-off and landing operations. The presence of obscurants such as dust, sand, snow, etc. beneath the aircraft limits the use of human visual imaging as a way to determine terrain features. Ensuring the utmost safety under these conditions requires a detailed real time terrain map indicating ground features such as rocks, boulders, ditches, fence posts, and telephone poles, etc. Existing systems, however, suffer from drawbacks that limit their use for producing such a real time terrain map.

Traditional radar based scanning systems are limited in resolution of terrain features as well as maximum scan angle capability. Radar sensors are also susceptible to specular reflections from several natural materials, which can further diminish the terrain resolution. Furthermore, at large scan angles, the main lobe of the radar signal widens resulting in a large RF footprint on the ground. This limits the ability of the aircraft to operate covertly.

Millimeter wave (MMW) scanning radar works on a similar principle as traditional radar systems. Due to its reduced wavelength (typically 77 GHz), MMW radars are capable of relatively high cross range resolution. This however comes at the expense of a large aperture size. As an example, a 1° conical footprint requires a 224 mm (9") clear aperture. In general, both radar and MMW systems have size, weight, and power draw requirements that are not ideally suited for helicopter applications.

Another approach involves splitting optical signals into equal intensity sub-beams that are optically delayed via the use of plane-parallel plates. These individual sub-beams can be thought of as elements of a phased array. Beam steering is then achieved by wavelength tuning the primary laser source such that the relative phase of these sub-beams is varied in time. While this approach generates one-dimensional beam steering, the technique can be extended to two dimensions by placing a second set of parallel plates in series. However, this concept only works for well-defined phase differences between the individual beams in the array. Introduction of phase error can significantly reduce the on-axis optical power and degrade the resolution of the measurement. For this reason, this technique is not recommended for applications involving vibrating platforms.

Other work involves use of micro-electro-mechanical systems (MEMS) devices for beam steering applications. While considerable work has been done in this area towards improving the speed, scan angle, and intrinsic stability of MEMS devices, the insertion loss and power handling capability of such devices requires further improvement prior to use in high power LIDAR applications.

Other techniques such as acousto-optic beam deflectors have also been considered. Acousto-optic devices are fast, but suffer from low efficiency and produce an unwanted zero-order diffraction beam.

Existing techniques are not capable of meeting the size, weight, power draw, vibration, shock, update rate, and other essential harsh environmental requirements of a helicopter platform. More importantly, a viable technology must demonstrate reliable performance in a degraded visual environment (DyE).

SUMMARY

Therefore, what is needed are systems and methods for providing navigational aids in low or no visibility situations, e.g., for degraded visual cue environments.

In one embodiment, a system is disclosed including a modulator, a beam splitter, a phase modulator, a transceiver, an electro-optical receiver, and a signal de-multiplexer. The modulator is configured to modulate a beam, the beam splitter is configured to split the modulated beam into a plurality of beams, and the phase modulator is configured to phase shift each of the plurality of beams. The transceiver is configured to direct the plurality of phase shifted beams to reflect from a target region and to receive reflected beams, and the electro-optic receiver is configured to convert the reflected beams into corresponding electrical signals. The signal de-multiplexer is configured to receive the electrical signals, phase signals from the phase modulator, and a modulation signal from the modulator and to generate a range map of distances between the transceiver and points in the target region.

According to a second embodiment, there is provided a method comprising generating a modulated beam using a modulation signal, splitting the modulated beam into a plurality of beams, phase shifting each of the plurality of beams using respective phase signals, directing the phase shifted plurality of beams to reflect from a target region, receiving reflected beams from the target region, converting the reflected beams into corresponding electrical signals, generating a range map of distances based on the electrical signals, the phase signals, and the modulation signal.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

It is to be appreciated any additional disclosure found in the Figures is meant to be exemplary and not limiting to any of the features shown in the Figures and described in the specification below.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

One or more embodiment may comprise an all fiber optic laser based scanning system for real time terrain mapping under degraded visual conditions is disclosed. The sensor uses a highly stable single frequency, narrow line width fiber optic laser source which is modulated to achieve a desired pulse width and pulse repetition frequency (PRF) via an electro-optic device and the modulated signal is amplified. The amplified optical signals are split into N channels that correspond to N elements of an optically phased array that steers light by modulating the phase of light entering and exiting the optical system. A real time map of an underlying terrain is accomplished by sweeping the N channel array across the terrain while collecting range information from each scan grid.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present invention may be implemented.

This application discloses multiple embodiments of LIDAR based terrain mapping systems and methods that provide an excellent alternative to the radar and MMW systems. For example, the small size, reduced weight, low power draw, and vibration insensitive nature of fiber based LIDAR sensors allow them to be readily used in helicopter applications. This technology coupled with an innovative motion free scanning architecture housed behind a small aperture provide agile real time profiling of the ground under all conditions.

An example of a profiling system is found in U.S. Pat. No. 7,898,435, which is incorporated by reference herein in its entirety.

Fiber LIDAR Optical Phased Array for Beam Steering

Non-mechanical, agile optical beam steering for near real-time terrain mapping from a helicopter platform can significantly enhance a pilot's situational awareness in a reduced visual cue environment. An all-fiber, electronically scanned optical phased laser array is a high speed, high-resolution solution towards this need, as discussed in the disclosed embodiments.

Disclosed embodiments include an all fiber-optic, laser based scanning system for real time terrain mapping under degraded visual conditions using an optical phased array. An optical phased array steers light by modulating the phase of light entering and exiting the optical system. By applying a linear phase shift across the beam's wave front, the light propagating along the system's optical axis is steered to an off-axis angle. The angle of propagation is a function of the ratio of the optical wavelength to the distance over which a phase shift of $2\pi$ occurs.

An optical phased array may be seen as being structurally, although not functionally or operationally, similar to an antenna phased array. An antenna phased array consists of a group of antennas wherein the relative phase of signals feeding the antennas is varied in such a way that the effective radiation pattern of the array is reinforced in a pre-defined direction and suppressed in all other directions. A modulation of the relative phases of the input signals is then used to actively re-orient the aggregate radiation pattern of the array such that the entire field of view ahead of the antenna array is scanned.

According to one embodiment, a sensor uses a highly stable single frequency, narrow line width fiber optic laser source at, e.g., approximately 1550 nm. The laser output is modulated to achieve the desired pulse width and pulse repetition frequency (PRF) via a modulator, e.g., an electro-optic device and the modulated signal is amplified using a Master Oscillator Power Amplifier (MOPA) configuration. The amplified optical signals are split into N channels that correspond to N elements of an optically phased array.

In one example, these N equal intensity optical signals are sent towards a bank of phase modulators, e.g., LiNbO$_3$ phase modulators, or the like, via optical fibers. Pre-determined electronic voltages are applied to each element of the phase modulator bank to introduce a pre-selected phase gradient across the channels. The individually phased signals are further amplified via a bank of doped fiber optic power amplifiers. The level of amplification of each channel is defined by the energy per pulse required to measure range to the ground in a visually degraded environment. In one example, this sensor can be used as a landing aid, laser pulse energies are selected to ensure real time terrain mapping below altitudes of about 100 feet under high dust conditions.

In one example, the N fiber channels are transmitted through a bank of transceiver switches towards a beam combiner, e.g., customized tapered fiber bundle (TFB), or the like, where the individual optical fibers are bundled together tightly in a pre-determined geometry. In this example, the geometric arrangement of the fiber cores within the TFB therefore defines the cross section profile of the two-dimensional phased array. A lens assembly may be used as a beam expander to transmit the optical signals to the ground.

Figure 1:
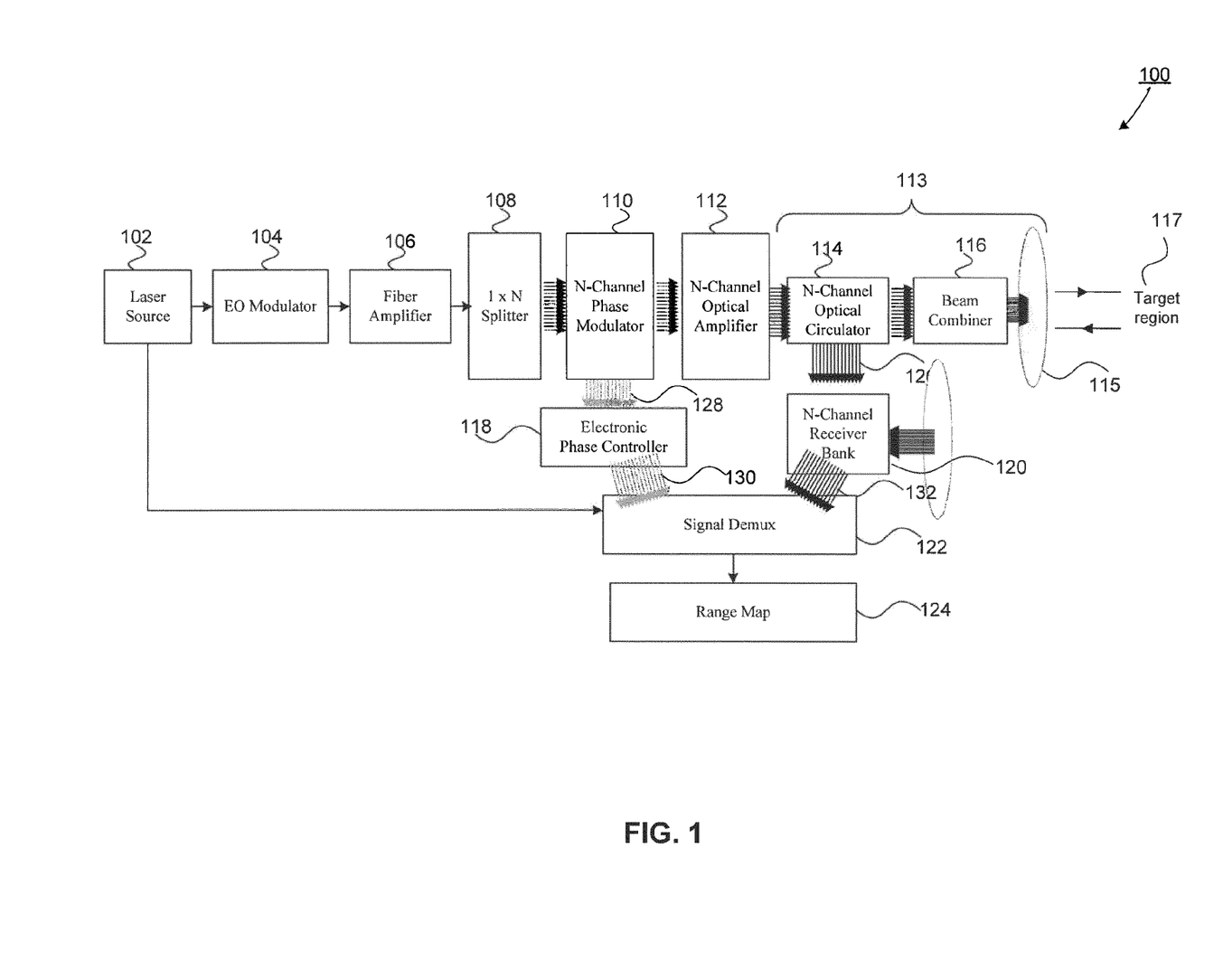
FIG. 1 illustrates an optically phased fiber array LIDAR system.

FIG. 1 illustrates a system 100, according to an embodiment of the present invention. This system 100 includes a laser source 102, an electro-optic modulator 104, a fiber amplifier 106, a 1×N beam splitter 108, an N-channel phase modulator 110, an N-channel optical amplifier 112, an N-channel circulator 114, a beam combiner 116, an N-channel receiver bank 120, and electronic phase controller 118, and a signal de-multiplexer 122.

In one example, the laser source 102 produces a coherent beam.

In one example, the modulator 104 is configured to modulate a beam to generate a modulated beam having a plurality of optical pulses. For example, the modulator 104 is an electro-optic modulator configured to modulate a beam in response to an applied electrical modulation signal.

In one example, the amplifier 106 is configured to amplify the modulated beam.

In one example, the beam splitter 108 is configured to split the modulated beam into a plurality of beams, and the phase modulator 110 is configured to phase shift each of the plurality of beams. The phase modulator 110 may include a plurality of LiNbO$_3$ phase modulating elements. Each phase modulating element may be configured to induce a phase modulation based on an applied electrical phase signal. In this example, phase shifted beams are amplified by the N-channel optical amplifier 112.

In one example, a transceiver 113 includes the circulator 114, the beam combiner 116, and lens optics 115. The transceiver 113 is configured to direct the plurality of phase shifted beams to reflect from a target region 117 and to receive reflected beams.

In on example, the circulator 114 may include a tapered fiber bundle (discussed below with respect to FIGS. 3A-3D and 4A-4D) including closely spaced optical fibers configured to provide the plurality of phase shifted beams to the lens optics.

In one example, the N-channel optical circulator 114 is configured to provide the plurality of phase shifted beams to the beam combiner 116 via optical fibers and to receive the reflected beams from the tapered fiber bundle via optical fibers. In an embodiment, beam combiner 116 can be a tapered fiber bundle.

The beam combiner 116 provides the plurality of phase shifted beams to the transceiver optics. The transceiver optics transmits the plurality of phase shifted beams to a target region. The target region may be the area below an aircraft carrying LIDAR system 100. The target region may include various sources that scatter radiation from the plurality of phase shifted beams. Some of the scattered radiation travels back to the transceiver optics in the form of reflected beams.

The reflected beams are collected by the common transceiver optics (illustrated schematically as the lens structure adjacent to the beam combiner 116). The return signals retrace their path via the beam combiner back to the circulator 114. The circulator 114 is configured to separate the phase shifted beams from the reflected beams based on direction of propagation and to provide the reflected beams to the electro-optic receiver 120 via optical fibers. The electro-optic receiver 120 is configured to convert the reflected beams into corresponding electrical signals 132.

In one example, the signal de-multiplexer 122 is configured to receive the electrical signals 132 from the electro-optic receiver 120, to receive phase signals 128 and 130 from the phase modulator 110, via the an electronic phase controller 118, and to receive a modulation signal from the laser source 102 (or from the modulator 104). The di-multiplexer 122 is further configured to generate a range map 124 of distances between the transceiver and points in the target region.

In one example, range returns measured by each of the N return channels are simultaneously analyzed in conjunction with the electronic phase modulation information using the de-multiplexer 122 to create a range profile of the terrain being mapped. A real time map of the terrain is accomplished by sweeping the N channel array across the terrain while collecting range information from each scan grid.

In another embodiment, a dual aperture scanning LIDAR system can comprise separate transmitter and receiver optics as indicated schematically by the lens structure adjacent to the beam combiner 116 (for the transmitter) and the lens structure adjacent to the N-Channel Receiver Bank 120 (for the receiver). See also FIG. 9 below for another example of this dual aperture scanning LIDAR configuration.

Fiber Optic Amplifiers

In one example, pulse energy levels to measure range to ground are generated using custom designed optical amplifiers. For example, the amplifiers are designed using fibers, e.g., Er:Yb active fibers, or the like.

Optical Phase Modulation

Figure 2A:
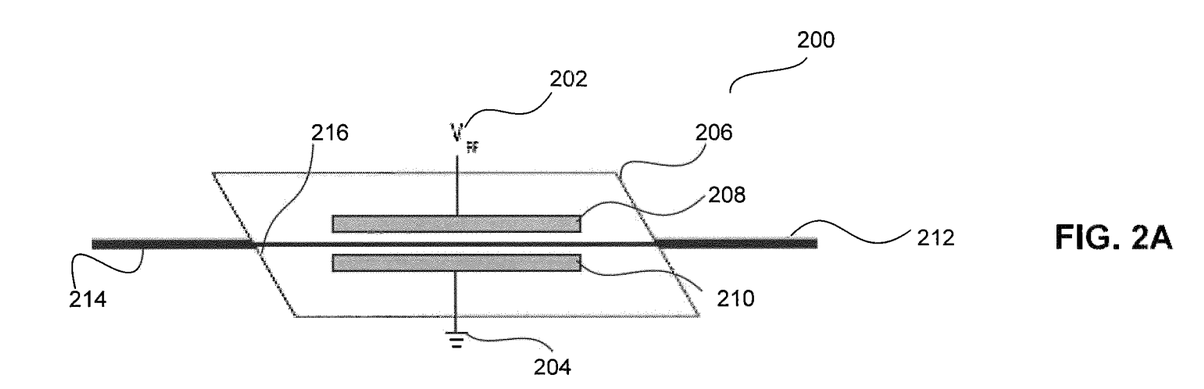
FIGS. 2A and 2B illustrate an integrated electro-optical phase modulator concept.
Figure 2B:
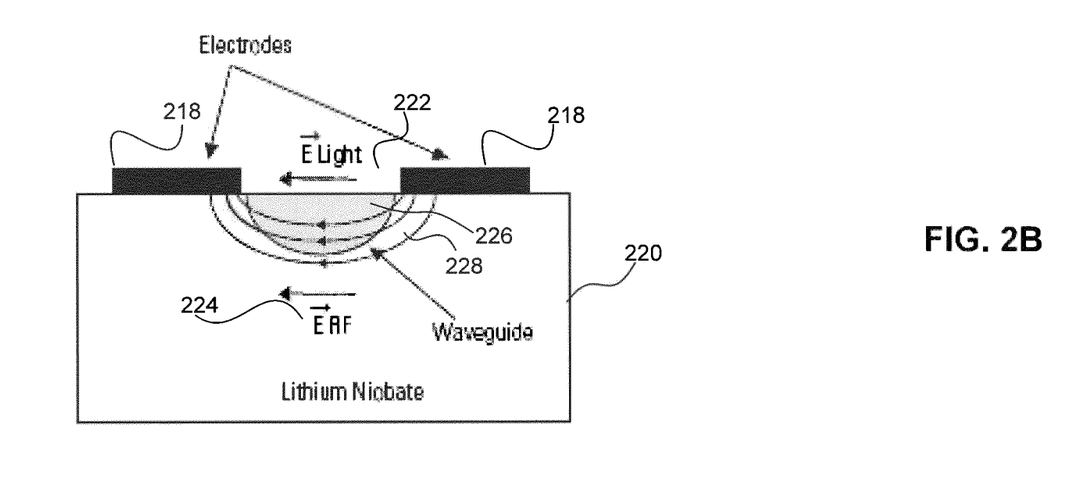

Elements of the N-channel phase modulator 110 can be implemented using electro-optical modulators as illustrated in FIGS. 2A and 2B. For example, to achieve phase modulation, an electric field is applied along one of a crystal's principal axes. Light polarized along any other principal axis experiences an index of refraction change and consequently an optical path length change. This change is proportional to the applied electric field. The phase of the optical field exiting from the crystal therefore depends on the applied electric field.

FIGS. 2A and 2B illustrate example electro-optic modulators 200 and 220, according to embodiments of the present invention.

In one example, the modulators can be a transverse modulator. Traverse modulators include an electro-optic crystal 206 between parallel electrodes (208 and 210). This modulator develops large electric fields between the electrodes 208 and 210 in response to a voltage applied (e.g., applied to terminals 202 and 204). The electric fields modify the index of refraction of the optical path 216 in which a beam propagates. This modulator provides large electric fields, while substantially simultaneously providing a long interaction length (e.g., the distance between the incoming beam 214 and outgoing beam 212) where the phase shift is effectively accumulated.

Another example electro-optic device 220 is illustrated in FIG. 2B. This device includes a waveguide 226 in an electro optic material, e.g., LiNbO$_3$. In this example, the beam propagates in the waveguide in the direction perpendicular to the page of the figure. Electrodes 218 on either side of the waveguide generate electric fields both in the material 228 and 224 as well as in the space surrounding the material 222. The applied electric fields in the material 228 and 224 modify the index of refraction of the beam propagating in the waveguide 226 causing a phase shift.

Mathematically, the optical phase shift obtained by applying a voltage, V, between the electrodes of a phase modulator is given by:

$$\Delta\phi = \frac{\pi n_o r V}{\lambda} \cdot \frac{l}{d} \quad (1)$$

where λ is the free-space wavelength and d corresponds to the electrode spacing within the modulator.

In an example where in fiber optic sensor systems where size, weight, and power requirements are critical, integrated optic phase modulators may be used. These devices are constructed using a dielectric optical waveguide. The linear electro-optic effect is used to control the index of refraction of the waveguide.

In the presence of the electric field, light propagating through the material will experience a change in the propagation delay, Δt, such that $$\Delta t = \frac{\Delta n l}{c} \quad (2)$$

This directly translated to a phase change, Δϕ, such that $$\Delta\phi = \omega \Delta t = \frac{\Delta n \omega l}{c}. \quad (3)$$

In Eqs. (2) and (3), Δn corresponds to the absolute change in refractive index due to the applied electric field, ω is the optical frequency, L is the interaction length, and c corresponds to the speed of light in vacuum.

For this application a phase modulator may be used. The low drive voltage, low insertion loss, stable operation over a wide temperature range, and high modulation speed make this device an ideal candidate for use in the proposed scanning sensor.

Transceiver Geometry

In embodiments of the present invention, the optical transceiver consists of three principal elements: (1) fiber optic transceiver switch (also called a circulator), (2) tapered fiber bundle (TFB), and (3) lens optics. The fiber optic transceiver switch includes a multi-channel optical circulator 114 designed to separate the direction of transmitted light from the received path. The output of the optical circulator 114 is coupled to a beam combiner 116. As an example, a beam combiner 116 is a passive fiber optic device. For example, beam combiners may be used to combine signal and pump wavelengths into a single fiber, (e.g., a tapered fiber bundle or the like).

Figure 3A:
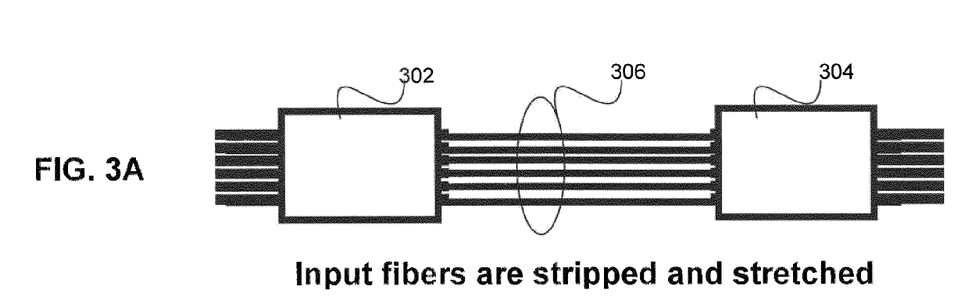
FIGS. 3A, 3B, 3C, and 3D illustrate the process of fabricating a custom designed N element tapered fiber bundle (TFB).
Figure 3B:
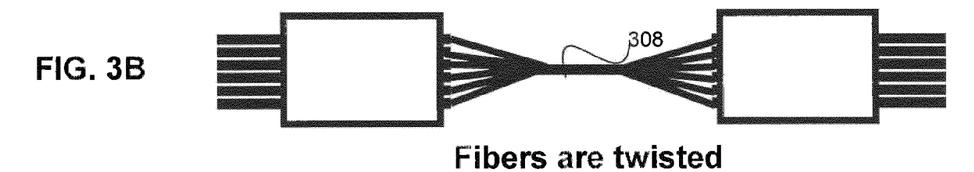
Figure 3C:
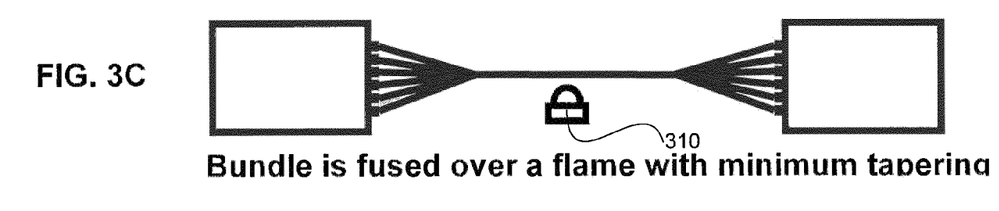
Figure 3D:
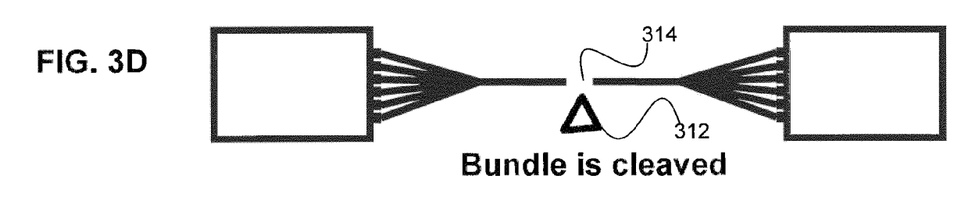

FIGS. 3A-3D illustrate a process for manufacturing TFBs. FIG. 3A shows N optical fibers 306 are first stripped of their outer most cladding and then mechanically held by mechanical devices 302 and 304. FIG. 3B shows the fibers are twisted to form a tight fiber bundle 308. FIG. 3C shows the bundle is fused by heating it with a flame 310. FIG. 3D shows the bundle is cleaved 314 using a mechanical device 312.

This process causes the claddings of the fibers to mesh together, thereby allowing the cores of the individual fibers to reside close to one another. This close spacing defines the separation between elements of the optically phased fiber optic array. This close spacing allows the beam combiner to provide the plurality of phase shifted beams to the lens optics such that wave fronts of the plurality of phase shifted beams overlap as they travel to the target region. As such the phase shifted beams constructively interfere to form a composite beam having a well-defined propagation direction as determined by the phase shifts of the phase shifted beams. By imposing time dependent phase shifts, the propagation direction of the composite beam acquires a corresponding time dependence. In this way, the composite beam can be electronically steered through the electronic control signals applied to the phase shifter.

Figure 4A:
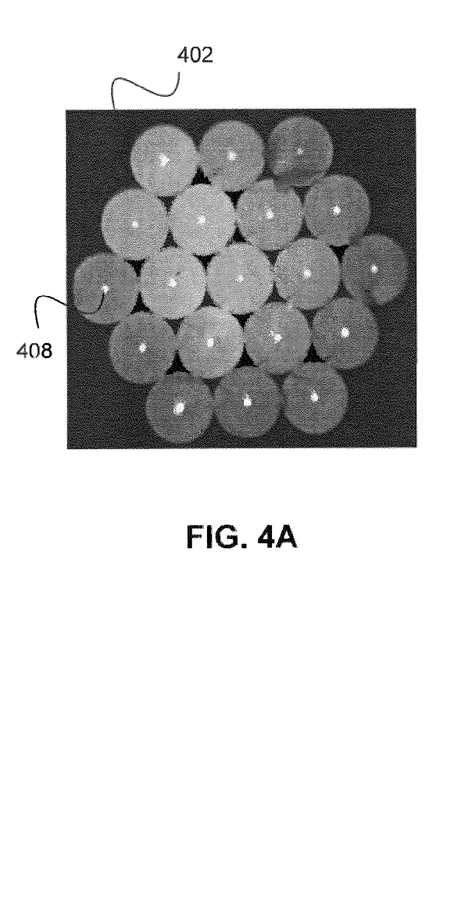
FIGS. 4A, 4B, and 4C are a cross section profile of various stages of fiber tapering process.
Figure 4B:
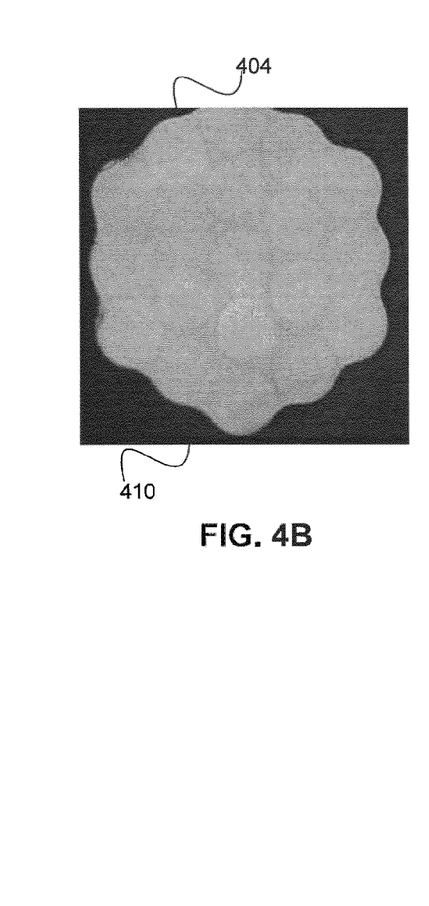
Figure 4C:
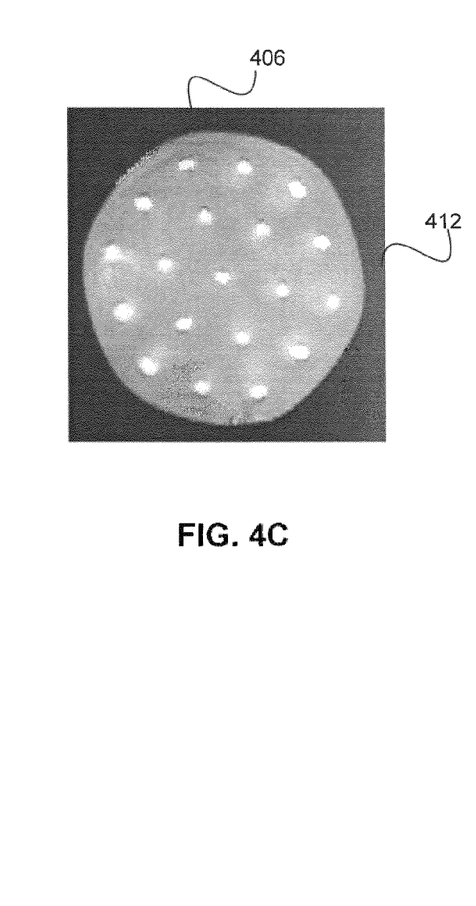

FIGS. 4A-4C show a cross sectional view of the TFB being created in the process shown in FIGS. 3A-3D. FIG. A shows cross section 402, where fibers with their outermost cladding removed 408 are brought into close proximity. FIG. 4B shows cross section 410 the individual fibers have become fused into a fiber bundle 404. FIG. 4C shows a cross section 406, i.e., the resulting array having closely spaced fiber cores 412.

Figure 5:
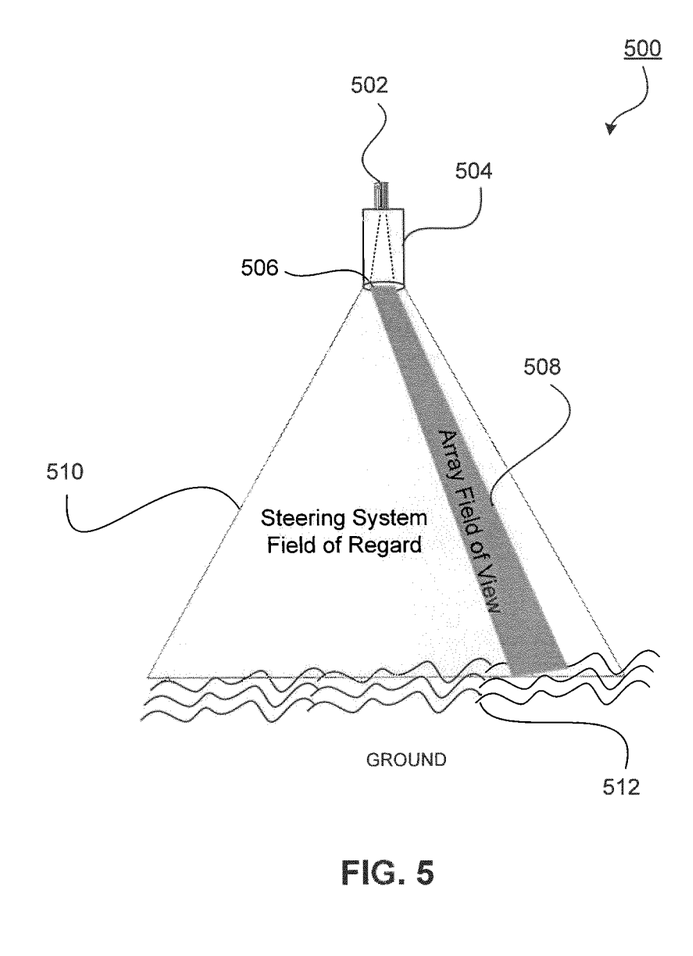
FIG. 5 illustrates a transceiver operational geometry.

FIG. 5 shows a transceiver system 500, according to an embodiment of the present invention. In this embodiment, a two dimensional optically phased array 502 is integrated with a transceiver lens 504 such that the output of the TFB is located in the focal plane of the lens 506. In one example, lens 502 may be 80 mm in diameter. The TFB 502 is configured to provide the plurality of phase shifted beams to the lens optics 504 and 506 such that wave fronts of the plurality of phase shifted beams overlap as they travel to the target region and constructively interfere to form a composite beam 508 having a well-defined propagation direction as determined by the phase shifts of the phase shifted beams. By imposing time dependent phase shifts, the propagation direction of the resulting composite beam 508 acquires a corresponding time dependence. In this way, the beam 508 can be scanned over a particular region 510. As the beam interacts with target regions on the ground 512 a certain fraction of the beam becomes reflected back to the lens aperture 506. The reflected beams can be used to make range measurements to determine the distance between the system and points in the target region 512.

Figure 6:
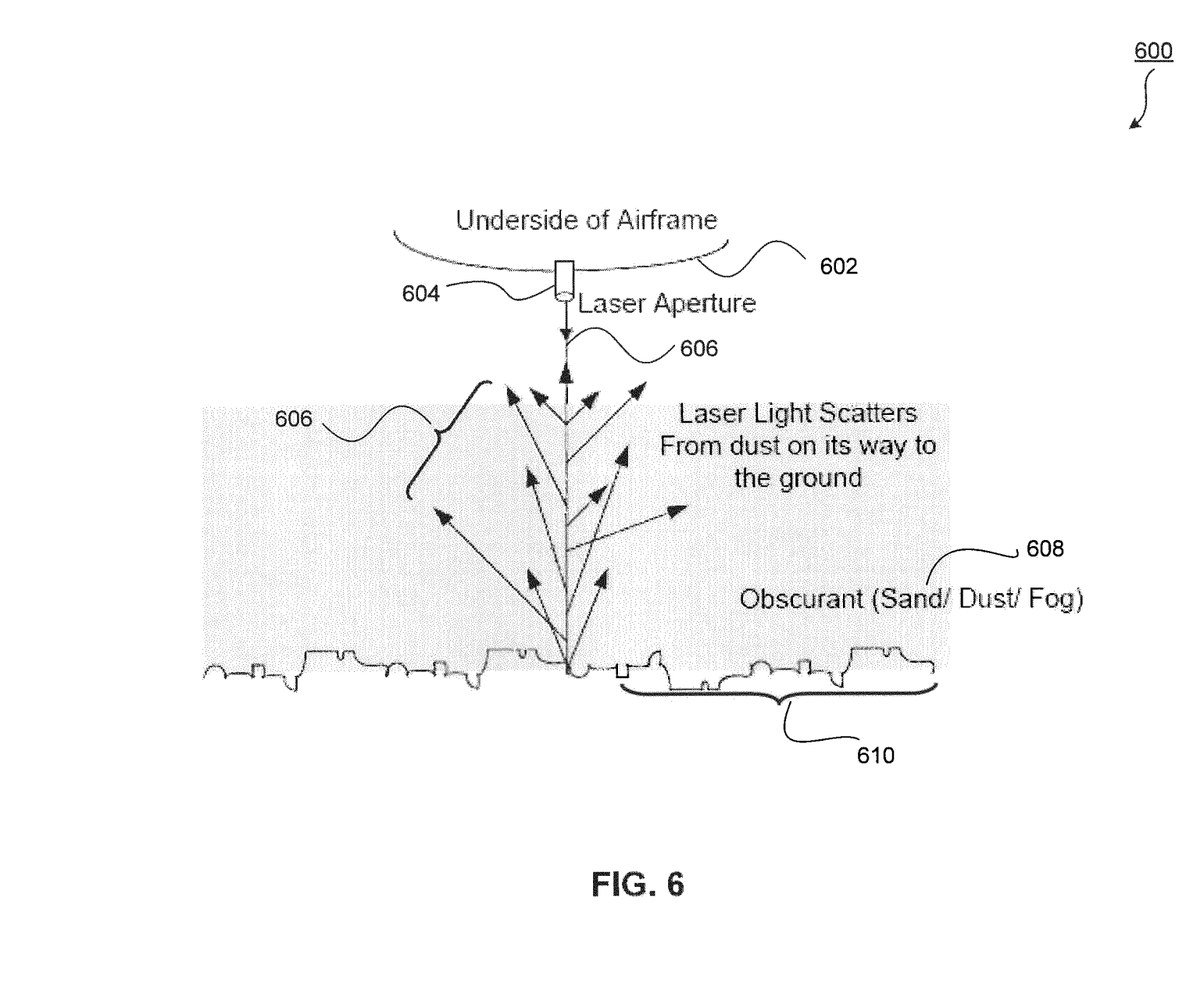
FIG. 6 illustrates laser backscatter in the presence of obscurants.

FIG. 6 illustrates an operational configuration 600 of the system 500 when used to make range measurements in degraded visual cue environments, according to an embodiment of the present invention. With reference to FIGS. 5 and 6, in the example shown system 500 having a laser transceiver 504 can be mounted on the underside of an aircraft 602. An incident beam 606 is scattered by various sources including obscurants 608 such as sand, dust, or fog, as well as directly from ground 610. The scattering by these various sources leads to reflected light traveling in a range of directions 606. Some of this reflected light is recaptured by the transceiver optics 504 and can be used to make range measurements.

In one example, range measurements collected by each array element within the array field of view are coupled back to the transceiver switch through common optics and directed towards a bank of electro optic receivers.

Electro-Optic Receivers

In one embodiment, backscattered optical signals are heterodyned with a stable local oscillator signal and the mixed RF signal is incident on a photo detector array and corresponding receiver electronics. The electronic bandwidth of the receiver is designed to take into account the frequency shift induced by relative motion of the helicopter platform during the course of the measurement. The frequency shift (i.e., the Doppler shift) is obtained by combining a reflected beam with a reference beam from the local oscillator. From this information a velocity of the system relative to the target region can be determined.

De-Multiplexer

In one example, a process of determining ranges is implemented using components illustrated in FIG. 1. In an example, the de-multiplexer 122 receives phase signals 130 from the phase modulator 110 via the phase controller 118. From the phase signals, the direction of the composite beam is determined as a function of time. The receiver 120 converts the reflected beams into electrical signals that are provided to the de-multiplexer 122. The de-multiplexer also receives a modulation signal from the laser source 102 or from the modulator 104. For each beam direction, a distance can be determined from the electrical signals and from the modulation signal. A range map 124 of distances between the transceiver and points in the target region can then be determined based on the propagation direction and determined distance. The range map can be further corrected based on the determined velocity of the system relative to the target region.

Data Acquisition and Processing

In one embodiment, RF signals from the N channel receiver is digitized and processed. To satisfy the Nyquist condition and obtain reliable data, the digitizer should sample at least twice the maximum input frequency. A nominal sample rate of 2.5 GS/s per channel is considered. This rate is achievable using currently existing, though state-of-the-art, high-speed ADC technology.

In one example, electronic phase control information imprinted on the transmit signals is also used to demodulate the received range data. This allows the range information measured by any one channel of the array to be associated with a spatial location on the ground relative to the aircraft.

In one example, radial and down-range motion of the aircraft over the landing zone results in a Doppler shift within the range estimate. Additionally, tangential and cross range speeds can also induce measurement losses. In one example, frequency modulation of the transmitted signal is therefore additionally to compensate for the motion of the platform.

System Size and Weight

According to the embodiments, due to the nature of the system components, the system can be miniaturized to an extremely small and lightweight package. Unlike conventional optics, fiber optic components are inherently miniaturized.

Measurement Capabilities

In one example, disclosed sensor system is designed to characterize the terrain below the aircraft such that any surface anomalies will be identified on a virtual terrain map. The ground slope of the terrain can be calculated based on the range measurements. The sensor system is designed such that attention can be rapidly directed towards 'objects of interest' as discussed below.

In one example, an important aspect of the system is that it is a scalable design of the phased fiber array allows additional fiber elements to be added in the future to increase scan rate as well as increase the sensor field of regard in the future.

Figure 7:
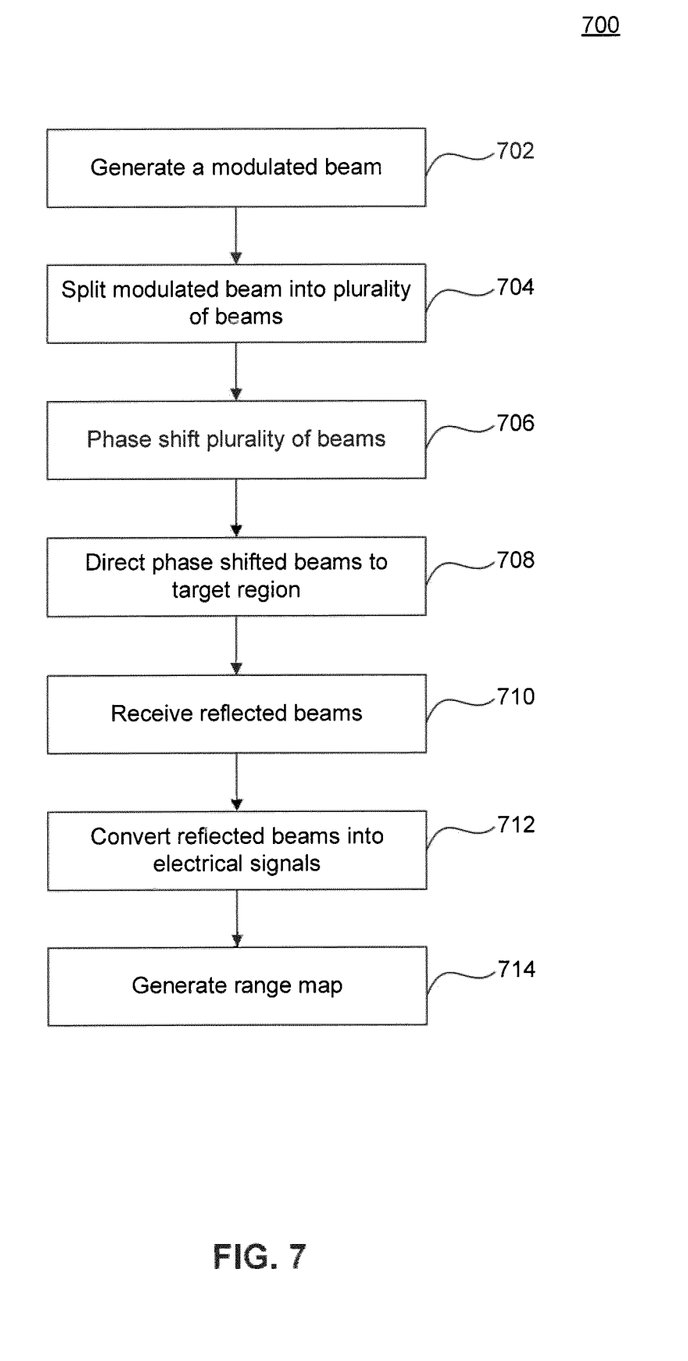
FIG. 7 is a flowchart depicting a method.

FIG. 7 is a flowchart depicting a method 700, according to an embodiment of the present invention. For example, one or more of the system described in FIGS. 1-9 above can be used to perform the method. It is to be appreciated that method 700 can be performed in any order, including the order described, and one or more of the steps may be optional based on a particular application.

In step 702, a modulated beam is generated using a modulation signal.

In step 704, the modulated beam is split into a plurality of beams.

In step 706, each of the plurality of beams is phase shifted using respective phase signals.

In step 708, the phase shifted plurality of beams are directed to reflect from a target region. In one example, the directing further comprises directing the phase shifted plurality of beams so that wave fronts of the plurality of phase shifted beams overlap as they travel to the target region and constructively interfere to form a composite beam having a propagation direction as determined by the phase shifts of the phase shifted beams. In another example, the directing further comprises imposing a plurality of time dependent phase shifts to the phase shifted beams so that the composite beam has a corresponding time dependent propagation direction.

In step 710, reflected beams are received from the target region.

In step 712, the reflected beams are converted into corresponding electrical signals.

In step 714, a range map of distances is generated based on the electrical signals, the phase signals, and the modulation signal.

In one example, method 700 can further comprise generating a modulated beam having a plurality of optical pulses using a modulation signal comprising a plurality of electrical pulses, imposing a plurality of time dependent phase shifts to the phase shifted beams so that the composite beam has a corresponding time dependent propagation direction, receiving a reflected beam for each propagation direction, receiving a reference beam, determining, for each propagation direction, a Doppler shift based on the reflected beam and the reference beam, determining, for each propagation direction, a velocity of the system relative to the target region based on the Doppler shift, determining, for each propagation direction, a distance based on the reflected beam and the modulation signal, generating a range map of distances between the transceiver and points in the target region based on the propagation direction and determined distance, and correcting the range map based on the velocity of the system relative to the target region.

In another example, method 700 further comprises displaying the corrected range map and using the displayed range map during operation of an aircraft to determine distances and velocities between the aircraft and a surface of the earth.

Addressing the Field of Interest

Figure 8:
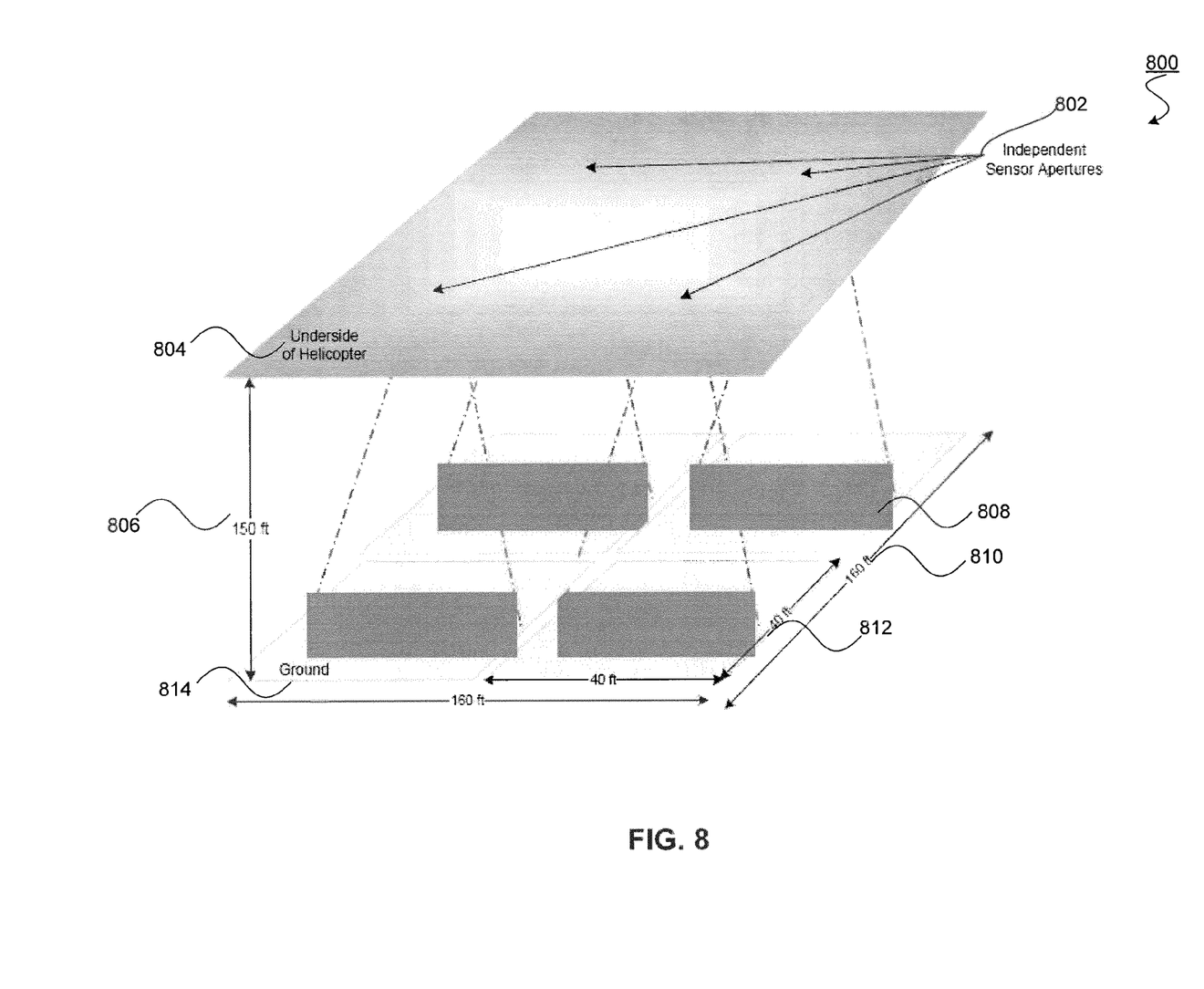
FIG. 8 is an illustration of a quad sensing concept.

In one example, a single channel LIDAR performance presented in the previous section can be scaled to address a sensor field of interest FIG. 8 shows a system including four transceivers, according to an embodiment of the present invention. The measurement field of interest (i.e., the area that can be covered) can be increased by using a system with multiple transceivers 802. In one example, the required field of interest is an area of approximately 160 ft×160 ft from an altitude of approximately 150 ft. This corresponds to a +/−30 degree field of view for the system. To meet the data update rate requirement for the system and to allow for a 'quick zoom,' capability, a quadrant sensing approach is proposed. The proposed concept is shown in FIG. 8.

Four independent sensor apertures 802 are located in four quadrants below the aircraft 804. In this example, the aircraft 804 is at a distance 806 that is approximately 150 ft above the ground 814.

In one example, each of the four sensors 802 are designed to scan across one quarter (e.g., 808, 812, etc.) of the total field of interest 810, thereby reducing the measurement time and allowing for the update rate and 'quick scan and zoom' capability. Data from the four sensors is then integrated via a common processor to create a comprehensive range map of the terrain below the helicopter. Based on this approach, the field of interest for each sensor is reduced to +/−7.5 degrees.

Figure 9:
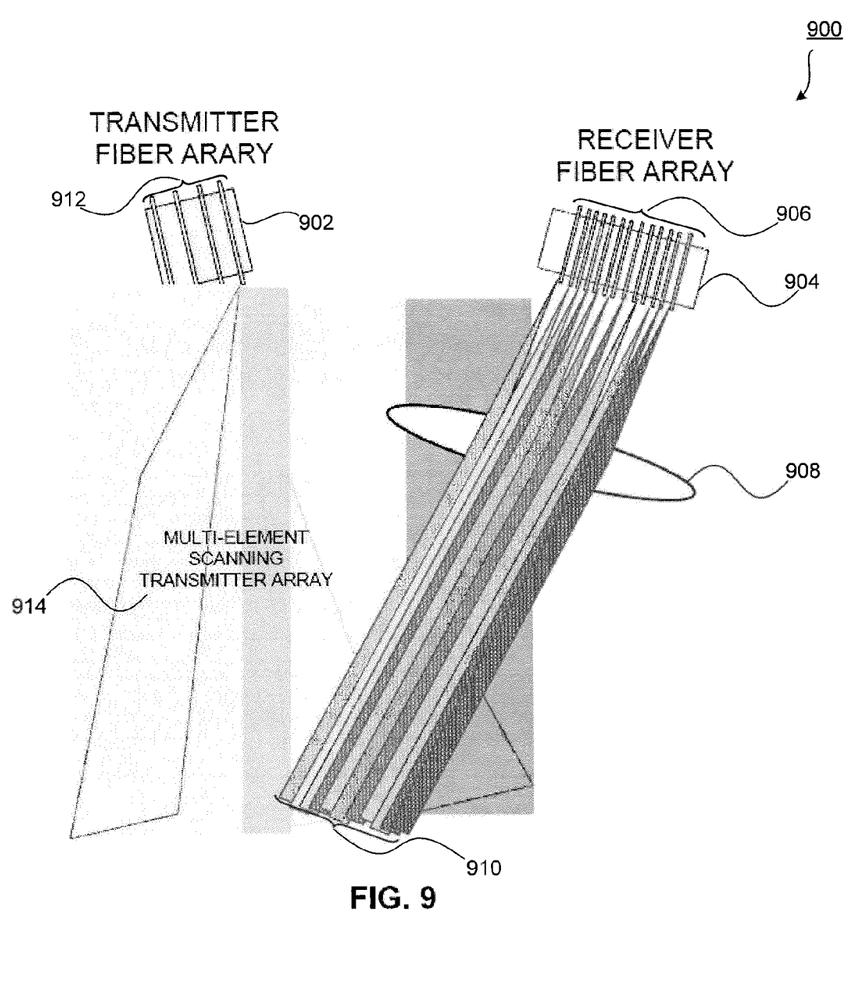
FIG. 9 is an illustration of a dual aperture scanning LIDAR.

FIG. 9 shows a dual aperture scanning LIDAR configuration 900, according to an embodiment of the present invention. In this example, system 900 includes a transmitter array 902 and a receiver array 904. The transmitter array includes a TFB having a plurality of closely spaced fibers 912. Likewise the receiver array includes a TFB having a plurality of closely spaced fibers 902. This system is configured to electronically scan the transmitted beam over a certain range 914. In turn, the multiple components of the transmitted beam are scattered from areas 910 of the ground or other scattering objects. Some of the scattered light is reflected back to the receiver aperture as a plurality of reflected beams 908. These reflected beams 908 can be used to determine a time dependent range map as was described above with respect to other embodiments.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system comprising:
a modulator configured to modulate a beam;
a beam splitter configured to split the modulated beam into a plurality of beams;
a phase modulator configured to phase shift each of the plurality of beams;
a transceiver configured to direct the plurality of phase shifted beams to reflect from a target region and to receive reflected beams;
an electro-optic receiver configured to convert the reflected beams into corresponding electrical signals; and
a signal de-multiplexer configured to receive the electrical signals, phase signals from the phase modulator, and a modulation signal from the modulator and to generate a range map of distances between the transceiver and points in the target region.

2. The system of claim 1, further comprising:
an optical fiber connecting the modulator to the beam splitter, wherein the optical fiber is configured to transmit the modulated beam from the modulator to the beam splitter;
a first plurality of optical fibers connecting the beam splitter to the transceiver, wherein each of the first plurality of optical fibers is configured to transmit a corresponding one of the plurality of phase shifted beams from the beam splitter to the transceiver; and
a second plurality of optical fibers connecting the transceiver to the electro-optic receiver, wherein each of the second plurality of optical fibers is configured to transmit a corresponding one of the reflected beams from the transceiver to the electro-optic receiver.

3. The system of claim 1, further comprising an optical fiber amplifier configured to amplify at least one of: the modulated beam, the plurality of phase shifted beams, and the reflected beams.

4. The system of claim 1, further comprising:
a plurality of optical fiber amplifiers;
a first one of the plurality of optical fiber amplifiers configured to amplify the modulated beam; and
remaining ones of the plurality of optical fiber amplifier configured to amplify corresponding ones of the plurality of phase shifted beams.

5. The system of claim 1, wherein:
the modulator is an electro-optic modulator configured to modulate a beam in response to an applied electrical modulation signal; and
the phase modulator further comprises a plurality of LiNbO$_3$ phase modulating elements,
wherein each phase modulating element is configured to induce a phase modulation based on an applied electrical phase signal.

6. The system of claim 1, further comprising a plurality of the transceivers configured to measure a larger target area.

7. The system of claim 1, wherein the transceiver further comprises:
lens optics configured to transmit the plurality of phase shifted beams to the target region and to the receive reflected beams therefrom; and
a tapered fiber bundle comprising closely spaced optical fibers configured to provide the plurality of phase shifted beams to the lens optics,
wherein the tapered fiber bundle is further configured to provide the plurality of phase shifted beams to the lens optics such that wave fronts of the plurality of phase shifted beams overlap as they travel to the target region and constructively interfere to form a composite beam having a well-defined propagation direction as determined by the phase shifts of the phase shifted beams.

8. The system of claim 7, wherein the tapered fiber bundle is further configured to receive reflected beams from the lens optics, the system further comprising:
a multi-channel optical circulator configured to provide the plurality of phase shifted beams to the tapered fiber bundle via optical fibers;
receive the reflected beams from the tapered fiber bundle via optical fibers;
separate the phase shifted beams from the reflected beams based on direction of propagation; and
provide the reflected beams to the electro-optic receiver via optical fibers.

9. The system of claim 7, further comprising:
another tapered fiber bundle configured to:
receive reflected beams from the lens optics; and
provide the reflected beams to the electro-optic receiver via optical fibers.

10. The system of claim 7, wherein the phase modulator is configured to impose a plurality of phase shifts to the phase shifted beams in a pre-determined way so that the composite beam has a corresponding pre-determined propagation direction.

11. The system of claim 7, wherein the phase modulator is further configured to impose a plurality of time dependent phase shifts to the phase shifted beams so that the composite beam has a corresponding time dependent propagation direction.

12. The system of claim 1, wherein the electro-optic receiver further comprises an optical mixer configured to:
receive a reflected beam;
receive a reference beam from the modulator; and
determine a Doppler shift based on the reflected beam and the reference beam.

13. The system of claim 12, wherein the de-multiplexer is further configured to;
determine the propagation direction of the composite beam based on the phase signals;
determine a distance based on the electrical signals and the modulation signal; and
determine a velocity of the system relative to the target region based on the Doppler shift.

14. The system of claim 1 further comprising:
a controller configured to:
generate a modulation signal comprising a plurality of electrical pulses, wherein the modulation signal causes the modulator to generate a modulated beam having a plurality of optical pulses;
generate time dependent phase signals, wherein the time dependent phase signals cause the phase modulator to impose time dependent phase shifts on each of the plurality of beams so that the composite beam has a corresponding time dependent propagation direction;
generate a range map of distances between the transceiver and points in the target region based on the determined propagation direction and determined distance;
correct the range map based on the velocity of the system relative to the target region;
storing, transmitting, or displaying the corrected range map velocity.

15. The system of claim 14, wherein the modulator is further configured to include a frequency modulation to compensate for the relative motion of the system and the target region.

16. A method comprising:
generating a modulated beam using a modulation signal;
splitting the modulated beam into a plurality of beams;
phase shifting each of the plurality of beams using respective phase signals;
directing the phase shifted plurality of beams to reflect from a target region;
receiving reflected beams from the target region;
converting the reflected beams into corresponding electrical signals;
generating a range map of distances based on the electrical signals, the phase signals, and the modulation signal.

17. The method of claim 16, wherein the directing further comprises:
directing the phase shifted plurality of beams so that wave fronts of the plurality of phase shifted beams overlap as they travel to the target region and constructively interfere to form a composite beam having a propagation direction as determined by the phase shifts of the phase shifted beams.

18. The method of claim 16, wherein the directing further comprises imposing a plurality of time dependent phase shifts to the phase shifted beams so that the composite beam has a corresponding time dependent propagation direction.

19. The method of claim 16, further comprising:
generating a modulated beam having a plurality of optical pulses using a modulation signal comprising a plurality of electrical pulses;
imposing a plurality of time dependent phase shifts to the phase shifted beams so that the composite beam has a corresponding time dependent propagation direction;
receiving a reflected beam for each propagation direction;
receiving a reference beam;
determining, for each propagation direction, a Doppler shift based on the reflected beam and the reference beam;
determining, for each propagation direction, a velocity of the system relative to the target region based on the Doppler shift;
determining, for each propagation direction, a distance based on the reflected beam and the modulation signal;
generating a range map of distances between the transceiver and points in the target region based on the propagation direction and determined distance; and
correcting the range map based on the velocity of the system relative to the target region.

20. The method of claim 19, further comprising:
displaying the corrected range map;
using the displayed range map during operation of an aircraft to determine distances and velocities between the aircraft and a surface of the earth.

* * * * *